United States Patent [19]

Disser et al.

[11] Patent Number: 4,987,351
[45] Date of Patent: Jan. 22, 1991

[54] LOAD-BASED CONTROL OF AN AC MOTOR

[75] Inventors: Robert J. Disser, Dayton; Jeff A. Foust, Eaton; Richard N. Lehnhoff, Kettering; Donald E. Graham, Dayton; Bruce A. Heaston, Union, all of Ohio

[73] Assignee: General Motors Corporation, Detroit, Mich.

[21] Appl. No.: 464,056

[22] Filed: Jan. 11, 1990

[51] Int. Cl.$^5$ .............................................. H02P 5/46
[52] U.S. Cl. ........................................ 318/78; 318/98; 388/811
[58] Field of Search .................. 318/78, 66, 4, 88, 98, 318/99, 628, 68, 255, 77, 430, 431, 432, 433, 474, 85, 565, 52, 615, 98, 461; 388/908, 909, 930, 832, 805, 806, 811, 814, 819, 820, 822; 364/426.04, 426.05; 187/112

[56] References Cited

U.S. PATENT DOCUMENTS

| | | | |
|---|---|---|---|
| 4,052,646 | 10/1977 | Massey et al. | 318/78 X |
| 4,402,387 | 9/1983 | Tsuji et al. | 187/112 |
| 4,527,653 | 7/1985 | Agarwal et al. | 318/487 X |
| 4,556,826 | 12/1985 | Trussler et al. | 318/85 X |
| 4,680,518 | 7/1987 | Kurakake et al. | 318/615 X |
| 4,695,941 | 9/1987 | Kumar | 318/565 X |
| 4,709,194 | 11/1987 | Yagi et al. | 318/52 X |

Primary Examiner—William M. Shoop, Jr.
Assistant Examiner—A. Jonathan Wysocki
Attorney, Agent, or Firm—Donald F. Scherer

[57] ABSTRACT

An AC motor control based on an iterative computation of the motor load and method of accurately determining motor load. At the initiation of motor operation, the load term (%LOAD) is initialized to zero, and the motor is energized in accordance with a predetermined voltage and frequency schedule for producing motor rotation. During the starting interval the power loss term LOSSES and the load term (%LOAD) are iteratively computed as a function of the input voltage and current ($V_{bus}$, $I_{bus}$) and the motor inverter frequency (IF). When a predetermined motor speed has been achieved, the run mode is initiated. At this point, the load is known based on the iterative load calculations performed during starting, and the motor voltage and inverter frequency are scheduled as a function of motor speed and load. The iterative computation of losses and load continue during the run mode so that changes in the motor load are taken into account.

3 Claims, 3 Drawing Sheets

LOAD-BASED CONTROL OF AN AC MOTOR

This invention relates to the control of an AC induction motor based on motor load, including a novel method of accurately determining the motor load.

BACKGROUND OF THE INVENTION

Motor voltage and frequency controls based on estimates of the motor speed and load are generally known in the motor control art. For example, it is known that the motor voltage can be boosted (increased) at relatively low speed to improve the motor output torque. As an efficiency measure, however, the voltage may be scaled back when the motor load is relatively light. Moreover, the frequency of the applied voltage may be increased with load to compensate for load-related slippage.

It is academic that the load of the motor, as a percentage of the full or rated load torque, is given by the expression:

$$\% LOAD = [(V_{bus} * I_{bus}) - LOSSES]/(IF/60 * HP)$$

where the product ($V_{bus} * I_{bus}$) represents the input power supplied to the motor drive electronics, LOSSES represents the power losses of the motor and drive electronics, IF/60 is the ratio of the inverter frequency IF to the rated motor speed of 60 Hz, and HP is the rated power of the motor in Watts. Unfortunately, however, the various terms are interrelated. For example, the frequency and voltage controls are based on load, and yet directly affect the load calculation. Moreover, the power losses used in the load computation vary with load as well.

Due to the above, prior motor control systems have achieved the voltage and frequency control based on estimations of the motor load. Unfortunately, the estimations are often relatively crude, yielding good load estimation under some conditions, and poor load estimation under other conditions.

SUMMARY OF THE PRESENT INVENTION

The present invention is directed to an AC motor control based on a novel and iterative computation of the motor load. At the initiation of motor operation, the load term (%LOAD) is initialized to zero, and the motor is energized in accordance with a predetermined voltage and frequency schedule for producing motor rotation. During the starting interval the power loss term LOSSES and the load term (%LOAD) are iteratively computed as a function of the input voltage and current ($V_{bus}$, $I_{bus}$) and the inverter frequency (IF).

When a predetermined motor speed has been achieved, the run mode is initiated. At this point, the load is known based on the iterative load calculations performed during starting, and the motor voltage and frequency are scheduled as a function of motor speed and load. The iterative computation of losses and load continue during the run mode so that changes in the motor load are taken into account.

DETAILED DESCRIPTION OF THE DRAWINGS

Figure 1:
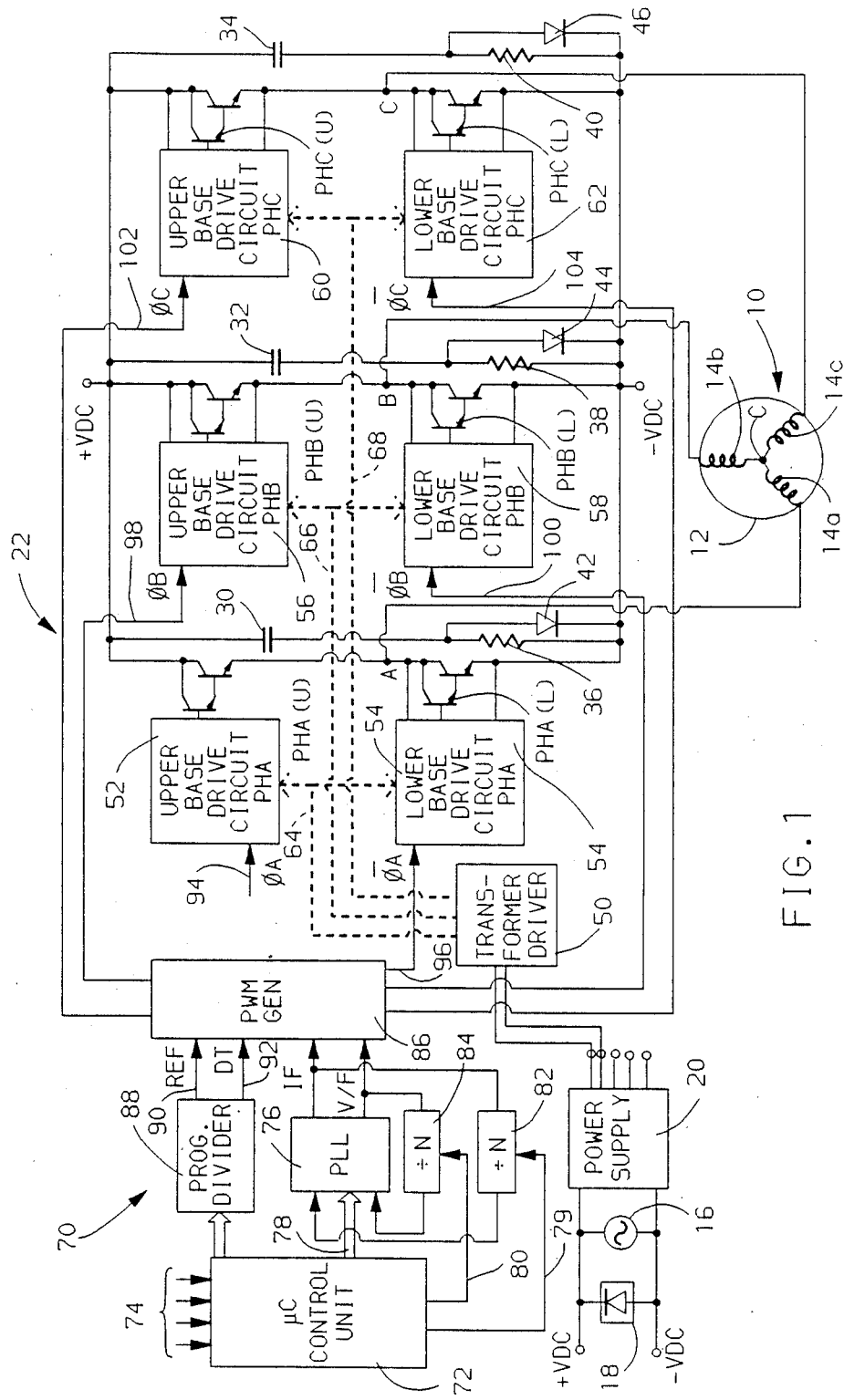
FIG. 1 is a block diagram of a computer-based controller for a three-phase induction motor according to this invention.

Referring to FIG. 1, the reference numeral 10 generally designates a three-phase AC induction motor comprising a rotor 12 and three stator windings 14a, 14b and 14c. The stator windings are mutually connected at one end to a common terminal C, and selectively connectible at their other ends to a source of direct voltage VDC. The voltage VDC may be generated from an external AC source 16 and a bridge rectifier circuit 18 as schematically shown in FIG. 1. Various other system voltages are provided by the power supply 20. The selective connection of the stator windings 14a, 14b and 14c to the voltage VDC is performed by the upper and lower power Darlington transistors PHA(U), PHA(L), PHB(U), PHB(L), PHC(U) and PHC(L) of a full-wave bridge inverter 22. Each such transistor includes an internal parallel-connected freewheeling diode (not shown) for carrying negative winding current and circulating inductive current at turn-off of the respective transistor. The winding 14a is connected to plus and minus VDC via the upper and lower bridge transistors PHA(U), PHA(L); the winding 14b is connected to plus and minus VDC via the upper and lower bridge transistors PHB(U), PHB(L); and the winding 14c is connected to plus and minus VDC via the upper and lower bridge transistors PHC(U), PHC(L). Connected across each pair of upper and lower bridge transistors is a conventional RC snubber circuit comprising a capacitor 30, 32, 34, a resistor 36, 38, 40 and a diode 42, 44, 46.

The forward and reverse base drive current control for the power transistors of bridge inverter 22 is performed by the transformer driver circuit 50 and individual base drive circuits 52, 54, 56, 58, 60 and 62 associated with each transistor. The transformer driver circuit 50, described in detail the co-pending, co-assigned patent application Ser. No. 338,821, filed Apr. 17, 1989, regulates the base drive current and is magnetically coupled to the base drive circuits associated with each phase winding, as indicated by the broken lines 64, 66 and 68. The base driver circuits 52, 54, 56, 58, 60 and 62 are all identical, and are also described in detail in the above-referenced Ser. No. 338,821.

The on/off control for the power transistors of bridge inverter 22 is performed by a computer-based PWM control circuit, generally designated by the reference numeral 70. The microcomputer uC 72 is responsive to various system inputs, as indicated by the reference numeral 74, and generates digital output commands for a dual phase-locked-loop (PLL) circuit 76 on lines 78, 79 and 80 pertaining to the desired inverter frequency (IF) and voltage-to-frequency (V/F) ratio. In each case, the uC 72 carries out the signal conversion by supplying a reference frequency to PLL circuit 76 via line 78, and controlling the operation of the feedback Divide-By-N circuits 82 and 84 via lines 79 and 80. The IF and V/F outputs of PLL circuit are applied as inputs to a PWM Generator chip 86, such as the Signetics HEF4752V. The uC 72 supplies the PWM chip 86 a reference frequency REF and information pertaining to the desired dead time DT via a programmable divider 88 and lines 90 and 92. The PWM chip 86 operates in response to the above described inputs and develops modulated on/off drive signals on lines 94, 96, 98, 100, 102 and 104 for the base driver circuits 52, 54, 56, 58, 60 and 62, respectively. The drive signals for the upper and lower bridge transistors of each phase are complementary, and the specified dead time refers to an inter-switching period during which both such transistors are signaled to a nonconductive or "off" state.

Figure 2:
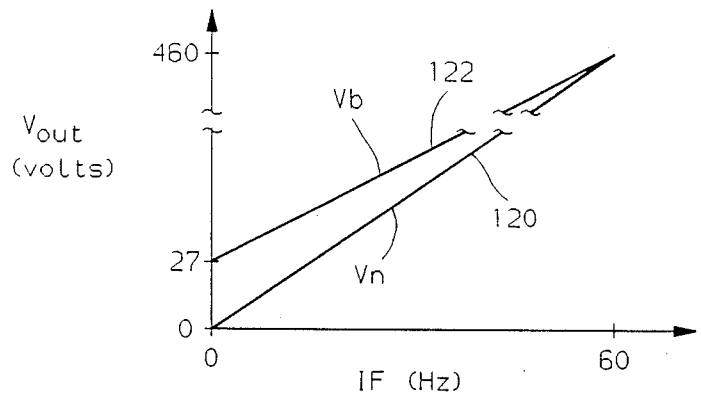
FIGS. 2-4 are graphs illustrating the speed and load based control of the motor energization voltage and frequency.

Traces 120 and 122 of FIG. 2 depict the normal (unboosted) and boosted motor voltages $V_n$ and $V_b$, respectively. In each case, the voltage is determined in relation to the motor speed. The trace 120 represents a fixed and predetermined V/F ratio chosen to provide generally optimum motor utilization. The trace 122 represents a modification to the standard V/F ratio which variably increases the applied voltage in relation to the motor speed. This function is referred to as "boost", and is generally employed at low motor speeds where the resistive component of the stator winding impedance is relatively high. The boosted excitation voltage increases the induced rotor current, and thereby allows the motor to develop its rated output torque. The amount of boost required varies with motor design and manufacture and is adjustable in the illustrated embodiment, the trace 122 representing an average or intermediate amount of boost.

Figure 3:
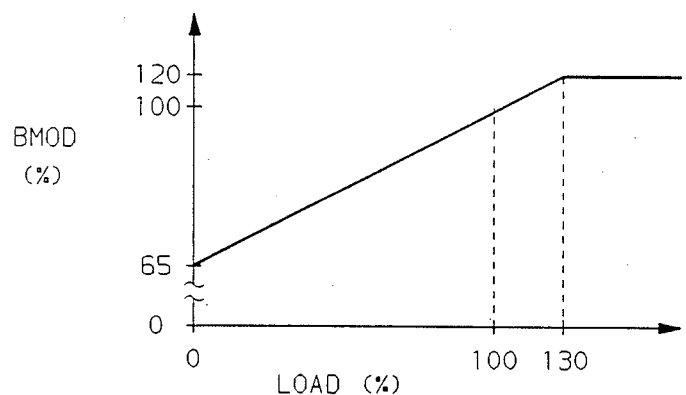

FIG. 3 depicts a load-based modification BMOD of the speed-based boost depicted in FIG. 2. The rationale for load-based boost modification is twofold. At loads less than 100%, the full rated output torque of the motor is not required, and the full boost voltage is not required. In the illustrated embodiment, for example, the boost voltage is linearly reduced from its normal value at 100% load to 65% of its normal value at 0% load. At loads greater than 100%, the motor current is relatively high, and once again, the resistive component of the stator winding impedance becomes relatively high. In this case, increased motor voltage is required to maintain the rated motor output torque. In the illustrated embodiment, for example, the boost voltage is linearly increased from its normal value at 100% load to 120% of its normal value at 130% load.

Figure 4:
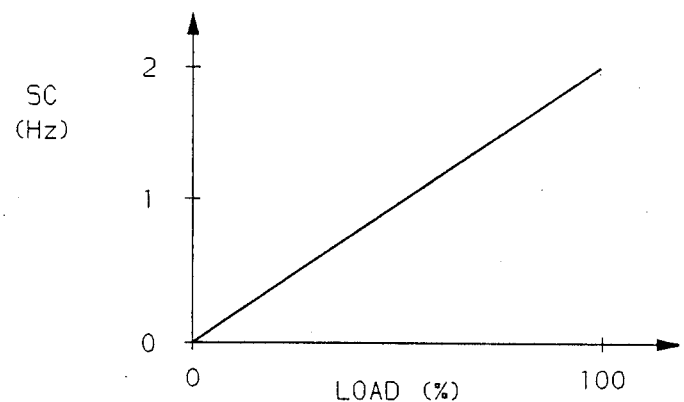

FIG. 4 depicts a load-based frequency adjustment SC to compensate for the motor load, and thereby maintain the motor output speed substantially constant regardless of load. In the illustrated embodiment, for example, the frequency is linearly adjusted by 2 Hz over the range of 0% load to 100% load.

Figure 5:
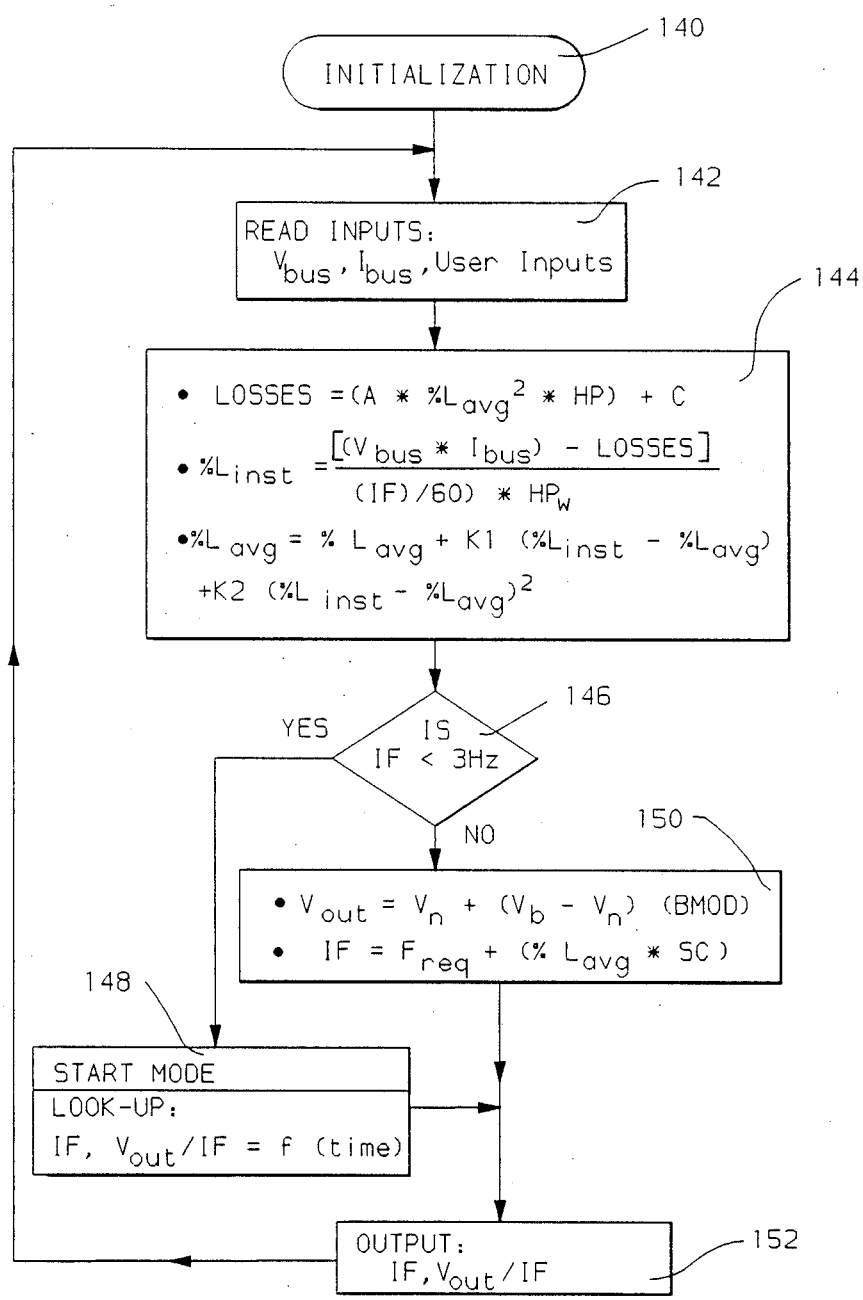
FIG. 5 is a flow diagram representative of computer program instructions executed by the computer-based controller of FIG. 1 in carrying out the control of this invention.

FIG. 5 is a flow diagram representative of computer program instructions executed by uC 72 in carrying out the control of this invention. The block 140 represents a set of instructions executed at the initiation of each period of motor operation for initializing the various timers, registers and variable values. Thereafter, the instruction blocks 142-152 are repeatedly executed as described below to develop the IF and V/F commands for the dividers 82 and 84 of PLL circuit 76.

The system parameters, including the bus voltage $V_{bus}$, the bus current $I_{bus}$ and various user inputs are read at instruction block 142. Referring to FIG. 1, the bus voltage is the voltage between +VDC and −VDC, and the bus current is the current supplied at voltage VDC. The user inputs may include the rated horsepower of the motor, the requested motor speed, and information concerning the desired amount of boost, voltage compensation, and frequency compensation.

The loss and load terms LOSSES, $\%L_{inst}$ and $\%L_{avg}$ are computed at block 144. For the initial computation, the terms $\%L_{avg}$ and IF are initialized by the block 140.

The expression for LOSSES, $$LOSSES = (A * \%Lavg^2 * HP) + C$$

was empirically developed, and represents the conduction and switching losses of the motor and drive electronics. The terms A and C are constants, HP is the rated horsepower of the motor and $\%L_{avg}$ is the average motor load as a percentage of the rated power of the motor.

The term $\%L_{inst}$ is given by the expression:

$$\%L_{inst} = [(V_{bus} * I_{bus}) - LOSSES]/(IF/60 * HP)$$

where the product of $(V_{bus} * I_{bus})$ is the input power to the motor and drive, IF/60 is the ratio of the inverter frequency IF to the rated motor speed of 60 Hz, and HP is the rated power of the motor in Watts.

The average load term $\%L_{avg}$ is simply a filtered form of the instantaneous load term $\%L_{inst}$, and is given by the expression:

$$\%L_{avg} = \%L_{avg} + K1(\%L_{inst} - \%L_{avg}) + K2(\%L_{inst} - \%L_{avg})^2$$

where K1 and K2 are empirically determined constants. In the illustrated embodiment, the squared term is not used during braking or low frequency/high load operation.

The motor is initialized in a start mode in which the inverter frequency IF and inverter output voltage $V_{out}$ are ramped up in an open-loop manner as a function of time, as indicated by the blocks 146 and 148. Once the inverter frequency reaches a threshold such as 3 Hz, as determined by block 146, the inverter frequency and output voltage commands are determined as a function of speed and load, as indicated at block 150. The run mode expressions for the inverter output voltage $V_{out}$ and inverter frequency IF are given by the expressions:

$$V_{out} = V_n + (V_b - V_n)(BMOD)$$

$$IF = F_{req} + (\%L_{avg} * SC)$$

where $V_n$ and $V_b$ are the unboosted and boosted speed-related voltages depicted by the traces 120 and 122 in FIG. 2. In the illustrated embodiment, user programmable gain factors are employed for the boost, boost modification and slip compensation functions to tailor the control to a specific motor; in this regard, the traces of FIGS. 2, 3 and 4 assume unity gain.

Once the inverter frequency and output voltage terms IF, $V_{out}$ are computed, during both start and run modes, the block 152 is executed to output the values corresponding to the inverter frequency IF and the ratio $V_{out}/IF$ to the dividers 82 and 84 of PLL 76 as described above in reference to FIG. 1, completing the program loop.

While this invention has been described in reference to the illustrated embodiment, it is expected that various modifications will occur to those skilled in the art, and it should be understood that systems incorporating such modifications may fall within the scope of this invention as defined by the appended claims.

The embodiments of the invention in which an exclusive property or privilege is claimed are defined as follows:

1. In an AC motor control wherein the electrical voltage and frequency supplied to the motor by a motor energization circuit are varied in relation to an estimate of average motor load, the improvement wherein the estimate of average motor load is developed according to a method comprising the steps of repeatedly:

measuring the electrical power input of the motor energization circuit;

computing a motor power loss term in relation to an estimate of the average motor load; and computing the instantaneous motor load in relation to the difference between the measured power input and the computed motor power loss term; and adjusting the estimate of the average motor load in relation to difference between it and the computed instantaneous motor load.

2. A method of operation for an AC motor comprising the steps of repeatedly:

measuring the electrical power input of the motor energization circuit;

computing a motor power loss term in relation to an estimate of the average motor load; and computing the instantaneous motor load in relation to the difference between the measured power input and the computed motor power loss term;

adjusting the estimate of the average motor load in relation to difference between it and the computed instantaneous motor load; and energizing the motor in accordance with voltage and frequency commands determined in relation to the speed of the motor and the estimate of the average motor load.

3. The method of claim 2, including the step of:

determining the motor voltage and frequency commands as a function of time without regard to the estimate of the average motor load when the motor speed is less than a predefined threshold.

* * * * *